United States Patent [19]
Knapp

[11] 3,868,819
[45] Mar. 4, 1975

[54] EXHAUST GAS PURIFYING APPARATUS
[75] Inventor: Heinrich Knapp, Leonberg-Silberberg, Germany
[73] Assignee: Robert Bosch GmbH, Stuttgart, Germany
[22] Filed: Nov. 24, 1972
[21] Appl. No.: 308,985

[30] Foreign Application Priority Data
Nov. 24, 1971 Germany............................ 2158119

[52] U.S. Cl.................... 60/276, 60/284, 60/285, 60/286
[51] Int. Cl........................................... F02b 75/10
[58] Field of Search ............. 60/276, 285, 286, 284; 123/119 R

[56] References Cited
UNITED STATES PATENTS
3,696,618 10/1972 Boyd...................................... 60/285
3,732,696 5/1973 Masaki................................. 60/284
3,739,758 6/1973 Knapp............................. 123/119 R
3,751,914 8/1973 Pollock................................ 60/284
3,768,259 10/1973 Carnahan............................ 60/276
3,775,064 11/1973 Berger................................. 60/307

Primary Examiner—Douglas Hart
Attorney, Agent, or Firm—Edwin E. Greigg

[57] ABSTRACT

In an exhaust gas purifying apparatus associated with a fuel-injected internal combustion engine, in the exhaust conduit there is situated a catalyst and, upstream thereof, a thermal reactor which is supplied with secondary air and secondary fuel as a function of the oxygen concentration in the exhaust conduit during the warm-up run of the engine. During warm engine run the primary fuel quantities required for the combustion in the engine cylinders are controlled as a function of the aforenoted oxygen concentration.

4 Claims, 1 Drawing Figure

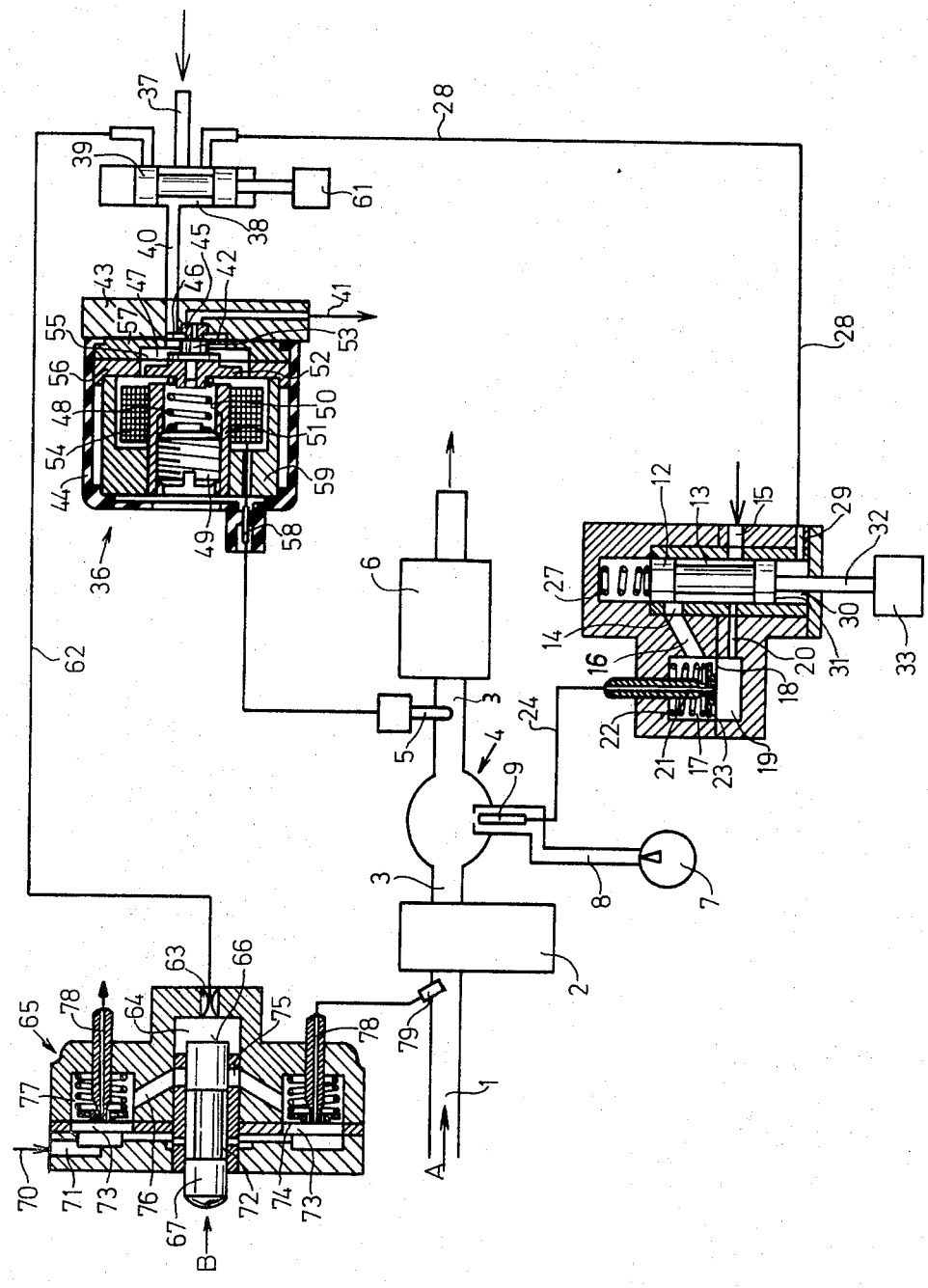

EXHAUST GAS PURIFYING APPARATUS

BACKGROUND OF THE INVENTION

This invention relates to an exhaust gas purifying apparatus for an externally ignited internal combustion engine that operates on fuel continuously injected into the air intake tube. The engine has an exhaust conduit in which there is situated, upstream of a catalyst, a thermal reactor having a secondary air pump.

The exhaust gases of internal combustion engines contain, among others, carbon monoxide, nitrogen oxides and uncombusted or partially combusted hydrocarbons which cause a substantial pollution of the air. In order to transform these harmful pollutants of the exhaust gas into harmless compounds like carbon dioxide, nitrogen and water, it has already been suggested to pass the exhaust gases through catalysts over a reaction temperature of approximately 400°C. For this procedure, however, it is necessary that the exhaust gas has a composition which permits a practically complete conversion into harmless compounds, that is, the ratio of the air to the fuel has to be approximately stoichiometrical which, as known, is designated with "an air ratio $\lambda$ close to 1." Since the temperature necessary for the reaction in the catalyst is reached during the warm-up of the engine only after a delay and further, since the cold internal combustion engine requires a certain fuel enrichment for a satisfactory run, the permissible limit values of the poisonous pollutants are significantly exceeded as early as the warm-up run of the engine. It has therefore been suggested to dispose upstream of the catalyst a thermal reactor with a secondary air pump, since the reaction taking place in the thermal reactor results more rapidly in higher temperatures. But even in such a case the permissible limit values could be observed only with the narrowest margin, since the engine itself has barely begun to run and during this period the thermal reactor does not deliver satisfactory exhaust gas values. For this reason regulations require for the exhaust gas purification a pre-heating period of approximately 20 seconds before the start proper of the internal combustion engine.

OBJECT AND SUMMARY OF THE INVENTION

It is an object of the invention to provide an improved exhaust gas purifying apparatus which delivers optimal exhaust gas values as early as the warm-up run of the internal combustion engine.

Briefly stated, according to the invention, in the exhaust pipe there is provided an oxygen sonde which, above the reaction temperature of the catalyst during the warm-up run of the internal combustion engine, controls the secondary fuel quantities admitted to the thermal reactor and, during the warm run of the engine, controls the primary fuel quantities injected into the suction tube.

The invention will be better understood as well as further objects and advantages become more apparent from the ensuing detailed specification of a preferred, although exemplary embodiment of the invention taken in conjunction with the sole figure which illustrates schematically and in section the apparatus incorporating the invention.

DESCRIPTION OF THE PREFERRED EMBODIMENT

Turning now to the FIGURE, in the exhaust gas purifying apparatus illustrated therein the combustion air flows in the direction of the arrow A in a suction tube portion 1 and therefrom to one or a plurality of cylinders 2 of an internal combustion engine. The exhaust gases are admitted from the individual cylinders 2 into an exhaust conduit 3 in which there are disposed a thermal reactor 4, and, downstream thereof, an oxygen sonde 5 and a catalyst 6. The thermal reactor 4 is supplied with secondary air through a secondary air pump 7 and a conduit 8 and with secondary fuel through a fuel nozzle 9. The metering of the secondary fuel quantities is effected by means of a control plunger 12, the annular groove 13 of which overlaps a control slot 14 to a greater or lesser extent.

The fuel delivered by a fuel pump (not shown) is admitted through a bore 15 into the annular groove 13 and therefrom, dependent upon the position of the control plunger 12, through the control slot 14 into a conduit 16 which opens into a chamber 17. The latter is separated by means of a diaphragm 18 from a chamber 19 which is in communication with the annular groove 13 by means of a conduit 20. In this manner the diaphragm 18 is exposed, on one side, to the pressure prevailing upstream of the control slot 14 and, on the other side, to the pressure prevailing downstream of the same control slot 14. Together with a stationary valve seat 21, the diaphragm 18 forms a differential pressure valve which changes its flow passage section between the diaphragm and the stationary valve seat until a predetermined pressure drop is obtained. The diaphragm 18 is exposed, in the opening direction of the differential pressure valve, to the force of a spring 22 which is supported by a spring seat disc 23. The secondary fuel is admitted from the differential pressure valve 18, 21 through a conduit 24 to the fuel nozzle 9. The radial face 31 of the control plunger 12 is exposed, against the force of a spring 27, to the pressure of a pressurized liquid circuit 28 communicating through a bore 29 with a pressure chamber 30 and is also affected by an actuating member 32 of a switching device 33.

The pressure in the pressurized liquid circuit 28 is controlled, as a function of the oxygen concentration in the exhaust gas of the internal combustion engine, by an oxygen sonde 5 by varying the control current of a pressure regulating solenoid valve 36. The fuel delivered by the aforenoted fuel pump (not shown) is admitted through a conduit 37 into an annular groove 38 of a slider 39 and therefrom through a conduit 40 to the solenoid valve 36. From the latter the fuel is adapted to flow back to a fuel tank (not shown) through a return conduit 41 in a depressurized condition. The pressure regulator solenoid valve 36 is formed as a flat seat valve in which a metal diaphragm 42 serves as the movable valve member. The diaphragm 42 clamped between a base body 43 and the housing 44 determines, together with a stationary valve seat 45 affixed to the base body 43, the flow passage section of the pressure regulator valve in the open position. A very small deflection of the diaphragm 42 suffices for opening the full flow passage section of the valve, whereby the throughgoing fuel may return to the fuel tank (not shown) in a depressurized condition through the return conduit 41. The diaphragm 42 separates two chambers 46 and 47 from one another and is loaded by a spring 48 the bias of which may be arbitrarily varied by means of a setscrew 49. The spring 48 works in the closing direction of the valve 36. The spring 48 is disposed in a bore 50 of a core 51 and affects the diaphragm 42 through an armature 52 which simultaneously serves as a spring seat disc and through a force transmitting memmber 53. The core 51 carries a solenoid 54. The armature 52 is suspended in a frictionless manner from a spider 55 which is clamped between the tensioning bodies 56 and 57. The control current is applied to the solenoid 54 through a socket 58. The magnetic circuit is closed by a ring 59.

When the internal combustion engine has reached its warm operational condition, a control device 61 shifts the slider 39 into a position in which it separates the pressurized liquid circuit 28 from the annular groove 38 and simultaneously establishes communication between the latter and the pressurized liquid circuit 62 which is in communication with a pressure chamber 64 of a fuel quantity distributor and metering valve 65 through a throttle 63. Into the pressure chamber 64 there projects that terminus of a control plunger 67 which contains a radial terminal face 66. Against the force of the pressurized liquid present in the chamber 64 there works in the opening direction of the fuel metering valve 65 (arrow B) a force which is a measure for the air flow rate in the suction tube 1. From the fuel pump (not shown) the fuel is admitted from a conduit 70 into a channel 71 in the housing of the fuel quantity distributor valve 65. The channel 71 leads to an annular groove 72 of the control plunger 67 and also, through a plurality of branch conduits to chambers 73, so that one side of a diaphragm 74 bounding the chamber 73 is exposed to the fuel pressure. Dependent upon the position of the control plunger 67, the annular groove 72 overlaps to a greater or lesser extent the control slots 75, each of which leads through an associated channel 76 to a chamber 77 that is separated from an associated chamber 73 by the diaphragm 74. From the chambers 77 the fuel is admitted through channels 78 to the individual fuel injection valves 79 (only one shown). The diaphragm boxes, each formed of a chamber 73 and 77, ensure that independently from the extent of overlap between the annular groove 72 and the control slot 75, that is, independently from the fuel quantity flowing to the fuel injection valves, the pressure drop at the fuel metering valve 72, 75 is maintained substantially constant. In this manner it is ensured that the setting motion of the control plunger 67 and the primary fuel quantity measured at the fuel metering valve 65 are proportionate to one another.

OPERATION OF THE PREFERRED EMBODIMENT

To ensure that the catalyst 6 is in a reactionready condition as early as the cold start of the internal combustion engine, upstream of the catalyst there is disposed a thermal reactor 4 in the exhaust conduit 3 of tthe internal combustion engine. During a preheating period of approximately 20 seconds, the thermal reactor is supplied with secondary air by means of a secondary air pump 7, and with secondary fuel by means of a fuel pump, not shown. The secondary fuel quantity is maintained constant by maintaining the control plunger 12 by the switching device 33 in a position which ensures that for the combustion in the thermal reactor 4 a sufficiently lean mixture is generated to thus avoid the generation of pollutants during the preheating period. The thermal reactor 4 is so designed that the catalyst reaches, during the predetermined period, a temperature necessary for reaction. Once the reaction temperature of the catalyst is reached, the start proper of the internal combustion engine follows either manually or automatically. During this procedure the switching device 33 frees the control plunger 12 for the regulation of the secondary fuel quantities. The oxygen sonde 5 has, during the preheating period, also reached its operational temperature and is now in a position to take over the $\lambda + 1$ regulation of the catalyst. For this purpose, dependent upon the change in the oxygen concentration in the exhaust gas, the control current and thus the magnetic field strength of the solenoid 54 is altered so that the armature 52 exerts a greater or lesser force against the spring 48. Since the pressure regulator valve 36 has to deflect only very slightly for the pressure control, the magnetic force, that is, the control current may be transformed directly into pressure. By suspending the armature 52 by means of the spider 55 and by designing the pressure control valve as a flat seat valve, the pressure regulator valve operates mechanically in an entirely frictionless manner. The magnetic hysteresis of the material is conventionally maintained at a low value by utilizing nickel-containing iron. The liquid pressure in the pressurized liquid circuit 28 controlled by the pressure regulating valve 36 exerts a force against the spring 27 in the pressure chamber 30 to the radial face 31 of the control plunger 12 thus determining the position of the control plunger 12 which, in turn, determines the secondary fuel quantities necessary for maintaining an air ratio of $\lambda$ close to 1. After the warm-up run of the engine is completed which may be determined, for example, by means of a coolant temperature sensor, the secondary air pump 7 is turned off and the slider 39 is shifted by a control device 61 into a position in which it interrupts communication between the pressure control valve 36 and the pressurized liquid circuit 28 and simultaneously establishes communication between the pressure control valve 36 and the pressurized liquid circuit 62. In this manner the spring 27 is allowed to shift the control plunger 12 into its closed position, whereby the metering of the secondary fuel is interrupted. In the warm condition of the internal combustion engine thus the pressure of the pressurized liquid circuit 62 controlled by the pressure regulator valve 36 affects, in the pressure chamber 64 of the fuel metering valve 65, the control plunger 67 in the closing direction. As a result, the control plunger 67 meters, as a function of the oxygen concentration in the exhaust gas, the primary fuel quantities.

The above-described exhaust gas purifying apparatus ensures that an air ratio of $\lambda = 1$ or a value very closely therebelow is accurately maintained with respect to the starting time and the efficiency of the catalyst and fuel consumption, for the purpose of obtaining optimal exhaust gas values both during the warm-up run and normal operation of the engine.

What is claimed is:

1. In an exhaust gas purifying apparatus for an externally ignited internal combustion engine operating on fuel continuously injected into its suction tube as primary fuel quantities, said engine having an exhaust conduit, said apparatus being of the known type that has (a) a catalyst situated in said exhaust conduit, (b)

a thermal reactor situated in said exhaust conduit upstream of said catalyst and (c) a secondary air pump connected with said thermal reactor for supplying thhe latter with secondary air, the improvements comprising A. An oxygen sonde disposed in said exhaust conduit and emitting signals as a function of the oxygen concentration of the exhaust gases, B. means for supplying said thermal reactor with secondary fuel quantities, C. means coupled to said oxygen sonde for varying said secondary fuel quantities in response to said signals during the warm-up run of said engine when the temperature of said catalyst is above its reaction temperature and D. means for varying said primary fuel quantities in response to said signals during normal operational temperatures of said engine.

2. An improvement as defined in claim 1, including

A. a first movable fuel metering member for varying said primary fuel quantities, B. a first pressurized liquid circuit connected to said first movable fuel metering member for affecting the position thereof as a function of the pressure in said first pressurized liquid circuit, C. a second movable fuel metering member for varying said secondary fuel quantities, D. a second pressurized liquid circuit connected to said second movable fuel metering member for affecting the position thereof as a function of the pressure in said second pressurized liquid circuit, E. a pressure regulating solenoid valve receiving said signals for operating as a function of said oxygen concentration and for varying the liquid pressure in both said pressurized liquid circuits, F. switching means disposed in said pressurized liquid circuits, said switching means adapted to assume a first position for establishing communication between said first pressurized liquid circuit and said solenoid valve and a second position for establishing communication between said second pressurized liquid circuit and said solenoid valve and G. means coupled to said switching means for moving the latter from said second position into said first position in response to the normal operating temperatures of said engine.

3. An improvement as defined in claim 2, wherein said switching means is formed of a slider adapted to hydraulically separate said first and second pressurized liquid circuits from one another.

4. An improvement as defined in claim 2, wherein said pressure regulating solenoid valve is formed as a flat seat valve having a diaphragm as its movable valve member.

* * * * *